United States Patent
Schroth

(10) Patent No.: US 7,100,991 B2
(45) Date of Patent: Sep. 5, 2006

(54) APPARATUS FOR POSITIONING AN OCCUPANT OF A VEHICLE

(75) Inventor: Carl-Jürgen Schroth, Soest (DE)

(73) Assignee: Schroth Safety Products GmbH, Arnsberg (DE)

(*) Notice: Subject to any disclaimer, the term of this patent is extended or adjusted under 35 U.S.C. 154(b) by 18 days.

(21) Appl. No.: 10/824,325

(22) Filed: Apr. 14, 2004

(65) Prior Publication Data

US 2004/0227390 A1 Nov. 18, 2004

(30) Foreign Application Priority Data

Apr. 14, 2003 (DE) ................. 103 17 314

(51) Int. Cl.
*A62B 35/00* (2006.01)
*B60R 22/12* (2006.01)

(52) U.S. Cl. ............... 297/468; 297/464; 297/465; 297/484; 297/487; 280/808; 280/748

(58) Field of Classification Search ............ 297/464, 297/465, 468, 484, 487; 280/808, 748
See application file for complete search history.

(56) References Cited

U.S. PATENT DOCUMENTS

| | | | | |
|---|---|---|---|---|
| 3,179,360 A | * | 4/1965 | Shelton et al | 297/465 X |
| 4,437,628 A | * | 3/1984 | Schwartz | 297/465 X |
| 4,923,147 A | * | 5/1990 | Adams et al. | 297/464 X |
| 6,224,154 B1 | * | 5/2001 | Stoki | 297/465 X |
| 6,733,398 B1 | * | 5/2004 | Clerx | 297/465 X |
| 2002/0021041 A1 | * | 2/2002 | Jessup et al. | 297/468 |

FOREIGN PATENT DOCUMENTS

DE 197 17 782 C2 11/1998

* cited by examiner

Primary Examiner—Rodney B. White
(74) Attorney, Agent, or Firm—Henry M. Feiereisen

(57) ABSTRACT

Apparatus for positioning an occupant of a vehicle in an area of a closeable roof hatch includes a carrier frame suspended within a vehicle below the roof hatch and including a vertical support portion and a horizontal standing area connected to the vertical support portion. A seat assembly for the occupant has a backrest which is guided by the vertical support portion for movement in a vertical direction between upper and lower end positions and is spring-biased to seek the upper end position. The seat assembly has a seating area, which is swingably mounted to a lower end of the backrest, and a coupling brace, which has one end swingably mounted to the seating area and another end swingably mounted to the standing area. Connected to the seat assembly is a seat belt for fastening the occupant.

23 Claims, 3 Drawing Sheets

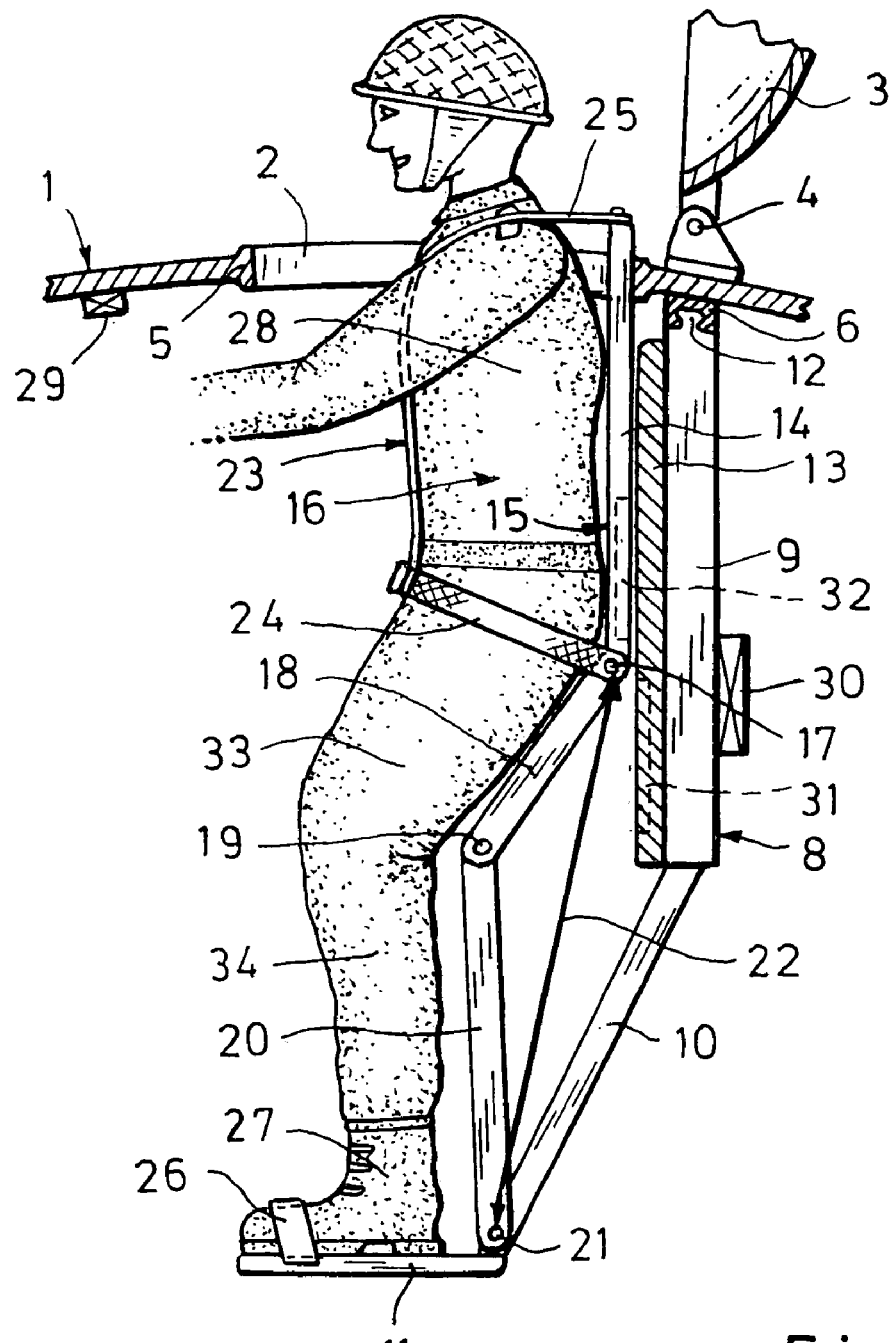
Fig.1
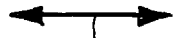

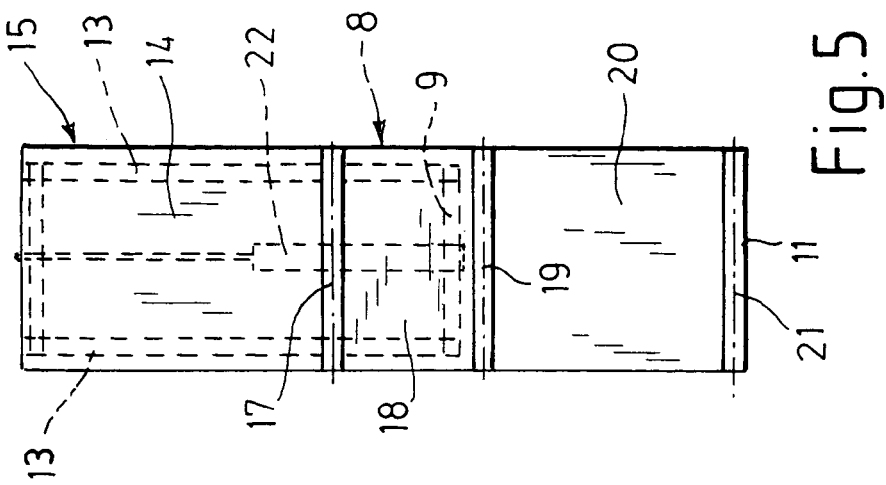
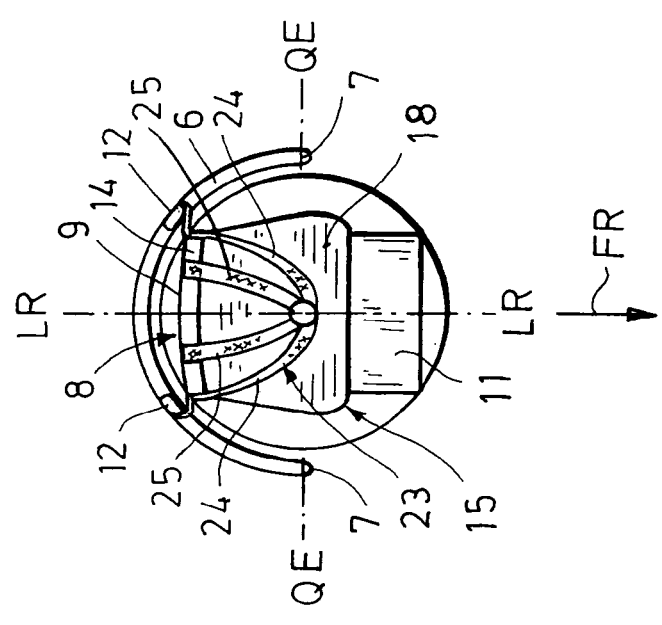
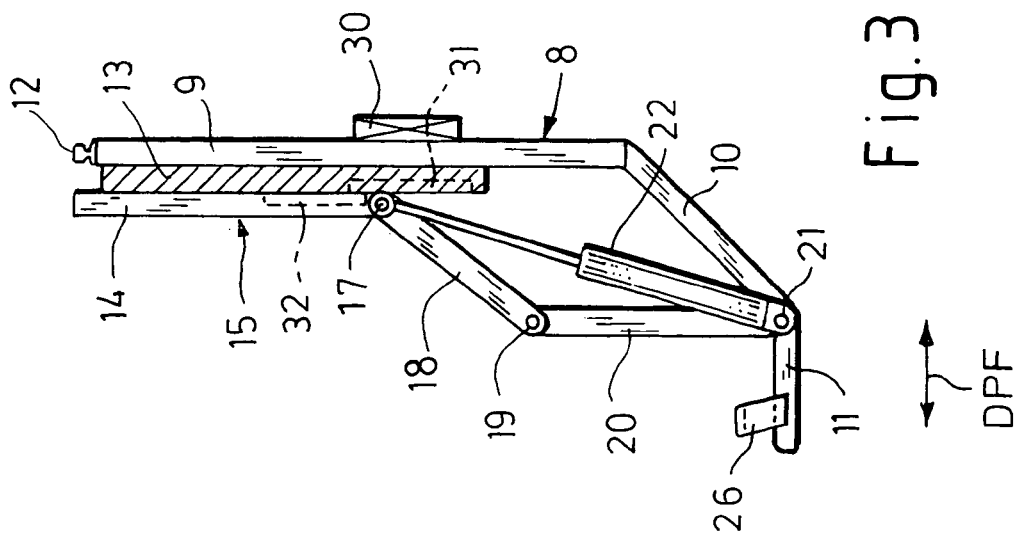

APPARATUS FOR POSITIONING AN OCCUPANT OF A VEHICLE

CROSS-REFERENCES TO RELATED APPLICATIONS

This application claims the priority of German Patent Application, Serial No. 103 17 314.5, filed Apr. 14, 2003, pursuant to 35 U.S.C. 119(a)–(d), the disclosure of which is incorporated herein by reference.

BACKGROUND OF THE INVENTION

The present invention relates to an apparatus for positioning an occupant of a vehicle in an area of a closeable roof hatch.

Vehicles, in particular armored vehicles used by the military or police, normally accommodate several occupants. One occupant, the so-called commander assumes the task to view the situation around the vehicle and to derive conclusions which may possibly be relayed to the other occupants. To enable the commander to reliably survey the surrounding environment, the vehicle involved here has a roof hatch which can normally be closed by a manually operated hatch cover. If the hatch cover is swung open to clear the hatch, the commander is able to stand in the hatch and to monitor the surroundings. For that purpose, the commander oftentimes stands on a seat of a seat formation, occasionally even upon a backrest of such a seat formation.

So long as the vehicle travels on a substantially flat terrain, the commander has no problem to fulfill the job. However, as the vehicle is exposed in addition to natural movements and braking operations to significant spatial vibrations, especially in off-road terrain, the commander has to protect himself or herself from hitting the upper body against the edge of the hatch by moving the upper body as far out as possible from the hatch and using the hands to hold onto external parts of the vehicle for stabilizing the position.

On occasion, occupants are confronted with a situation in which the armored vehicle rolls over. In this case, the commander is exposed and does not have a chance to retract fast enough through the hatch into the interior for safety, when a rollover occurs. Rather, the commander will be hurled out of the vehicle or even crushed by the vehicle. Another dangerous situation for the commander occurs when the vehicle strikes a mine which explodes and then causes the vehicle to tilt. In addition, a strong shock wave is generated which is transmitted through the bottom-mounted seat into the lower leg and thigh as well as spine of the commander, when the vehicle is caused to significantly accelerate in vertical direction as a consequence of the mine explosion.

One approach to address these problems involves to restrain the commander in normal seating position to a mechanically liftable seat by means of a safety belt and to lift the commander with the seat far enough to enable him or her to look out of the hatch for surveying the surroundings. Although this approach secures the commander to the seat assembly, there is still the problem that the seat assembly is coupled to the vehicle bottom. As a result, the commander is forced to follow all motions of the vehicle and thus can be subjected to oftentimes significant accelerating forces. Moreover, such a seat assembly has the drawback that its entire mass including the weight of the commander buckled thereto must be lifted and lowered. Lifting must be implemented by mechanical means because vehicles of this type normally are not equipped with a hydraulic system due to combustibility of hydraulic fluid. When the vehicle rolls over or hits a mine which then explodes, there is not enough time for the mechanic system to respond and move the seat assembly with the commander out of the danger zone in the area of the hatch.

Mechanical lifting of the seat assembly is also disadvantageous because the seat assembly blocks in the upper position the hatch so that the commander, even when unbuckling the safety belt, is unable to stretch in order to leave the vehicle via the hatch with straight legs. Thus, neither the commander nor any of the other occupants has an escape route out of the vehicle, when the seat assembly is secured in the upper position. Finally, there is also a risk that the seat assembly jams in the upper position, as a result of hitting a mine and of the resultant significant high accelerations, and then can no longer be moved downwards. Thus, the hatch is permanently blocked for use as escape route.

It would therefore be desirable and advantageous to provide an improved apparatus for positioning an occupant of a vehicle in an area of a closeable hatch to obviate prior art shortcomings and to enable the occupant to stand in the hatch to reliably assume surveying tasks while still assuring a safe return into the interior of the vehicle, when the vehicle tilts or rolls over or is exposed to a vertical acceleration in the event of an accident of any kind.

SUMMARY OF THE INVENTION

According to one aspect of the present invention, an apparatus for positioning an occupant of a vehicle in an area of a closeable roof hatch includes a carrier frame suspended within a vehicle below the roof hatch and including a vertical support portion and a horizontal standing area connected to the vertical support portion, a seat assembly for the occupant, with the seat assembly having a backrest guided by the vertical support portion for movement in a vertical direction between upper and lower end positions and spring-biased to seek the upper end position, a seating area swingably mounted to a lower end of the backrest, and a coupling brace having one end swingably mounted to the seating area and another end swingably mounted to the standing area, and a seat belt operatively connected to the seat assembly.

The present invention resolves prior art problems by providing a carrier frame which is suspended underneath the roof hatch and has a vertical support portion and a horizontal standing area for the commander. The suspended disposition of the carrier frame eliminates a force connection with the vehicle bottom so that shock waves caused, e.g., by a mine explosion are no longer transmitted through. The backrest of the seat assembly is mounted to the vertical support portion and thus can move only in vertical direction. As the backrest is permanently loaded to seek the upper end position, the components of the seat assembly, i.e., backrest, seating area and brace, exhibit in base position a substantially stretched vertical configuration. As a consequence, all occupants of the vehicle are able to easily access or exit the vehicle, when the hatch cover is swung open.

The commander enters the vehicle last and is able to stand upon the seating area and to buckle up using the seat belt, suitably a safety harness, for restraint against the seat assembly, preferably the backrest. The standing area is spaced from the backrest by a distance which is measured on the basis of an average height of a male occupant so that the occupant can survey the surroundings when standing in the hatch. There is no need for the occupant to hold onto the vehicle so that the hands are free for other activities.

When the occupant intends to sit down, there is only the need to angle the upper body in relation to the lower legs. The weight of the upper body is enough to overcome the spring force that tends to move the seat assembly into the stretched configuration, and to collapse the seat assembly in which the individual components are angled to one another so that the occupant can assume the anatomically correct posture while the backrest has shifted along the vertical support portion of the carrier frame.

Anthropometric tests have shown that the length of the thigh of an average male is about 400 mm. This thigh length of 400 mm has proven in ergonomic tests as sufficient for a displacement path of the head of an occupant from a seated position into an upright position and stretching and bending of the thighs relative to the lower legs. Thus, the occupant is able to use the own muscle force to switch from the seated position to the upright position, whereby the spring force moves the seat assembly accordingly as the backrest shifts along the vertical support portion of the carrier frame, and the brace, seating area and backrest assume the stretched disposition. To reverse this switch and thus to shift from the upright position to the safe seated position inside the vehicle, the occupant needs only to use the weight of the upper body to overcome the spring force, without interference by the seat belt.

In case the vehicle hits a mine and is vertically accelerated, the inertia of the occupant's body in upright position automatically causes the occupant to load the seat assembly in the direction of the vehicle bottom and thus moves the occupant rapidly into the seated position inside the vehicle. This movement is automatically accompanied by an angling of the backrest relative to the seating area, an angling of the seating area to the brace, and an angling of the brace to the standing area, so that the knee joints of the occupant are bent as well. As a consequence, the weight of the upper body, causing loads in longitudinal direction, can no longer affect the lower leg and thigh of the occupant. Also harmful longitudinally directed forces upon the spine of the occupant are at least significantly reduced or even entirely eliminated.

Also in the event of a rollover, the occupant is able to immediately assume the seated position while buckled up, as only the spring force that loads the seat assembly to seek the stretched configuration must be overcome.

The vertical support portion of the carrier frame can be so constructed that the backrest of the seat assembly slides or rolls along the vertical support portion. The carrier frame may also overall sized as to have a smallest possible weight which still exhibiting a reliable twist stiffness.

In order to provide the occupant in upright position with a better all-round view, the carrier frame may be constructed for rotation about a vertical axis. Hereby, the upper end of the carrier frame can be guided, slidingly or rollingly, by a curved rail which extends inside the vehicle along the edge of the hatch, preferably by about 180°. In this way, the occupant can move by about 90° to the left and right without constraints.

The spring force for continuously loading the seat assembly to seek the stretched configuration may be realized by at least one torsion spring in the joint regions between the backrest and seating area or between the seating area and the brace, or between the brace and the standing area, or by linearly operating motors as well as rotary servomotors. Currently preferred, however, is the use of a gas pressure spring for loading the seat assembly to seek a stretched disposition. A gas pressure spring is a simple component that requires little maintenance and can be incorporated, for example, between the joints interconnecting the backrest with the seating area, on the one hand, and the brace with the standing area, on the other hand. As an alternative, to connect the gas pressure spring also to the carrier frame, on the one hand, and the backrest, on the other hand. Of course, any configuration of installing the gas pressure spring is within the scope of the invention that loads the seating assembly to seek the stretched configuration.

The force applied by the gas pressure spring is selected high enough to oppose the movable mass comprised essentially of backrest with seat belt and the seating area.

According to another feature of the present invention, a locking mechanism may be provided for securing the seat assembly in the stretched disposition. An example of a suitable locking mechanism includes a lever and hook system which spontaneously locks the stretched configuration of the seat assembly and can be manually released by the occupant to shift to the seat position. Of course, the locking mechanism can be constructed in such a way that the locked connected can be released by external factors in the event of an emergency.

According to another feature of the present invention, the seat assembly may include at least one sensor and an adjustment unit rendered operative by the sensor for moving the seat assembly to seek a horizontal disposition. The adjustment unit may be secured to the vehicle body, suitably to the seat assembly, and should respond at a rollover of the vehicle or a mine explosion that causes a vertical acceleration of the vehicle, in order to release a possible locking of the seat assembly in the stretched configuration and move in a shortest possible time the seat assembly with buckled occupant into the lower angled configuration with horizontal seating area. The sensor may be secured to the seat assembly. Currently preferred is, however, a securement of the sensor to the vehicle body.

According to another feature of the present invention, the adjustment unit may be formed by a gas generator. The gas generator may be connected with a gas pressure spring or may activate a separate drive element for moving the seat assembly instantly, i.e. within fractions of a second, from the upper stretched configuration into the lower angled configuration.

A sudden shift of the seat assembly from the upper position to the lower position is accompanied by a great acceleration of the upper body. In order to gently slow down this acceleration, a damping mechanism may be provided by which the down movement of the seat assembly is attenuated. The damping mechanism is effective only when the adjustment unit is activated so that the shift of the seat assembly from the upper stretched configuration to the lower angled configuration is not impaired under normal operating conditions.

According to another feature of the present invention, the vertical support portion of the carrier frame may be extendible or compressible in a limited manner when exposed to predetermined longitudinally directed forces to convert them into energy. Such a damping mechanism is thus able to prevent these harmful longitudinally directed forces during the movement phase from the upper stretched configuration into the lower angled configuration from adversely affecting the occupant, in particular the spine of the occupant. This damping mechanism can be constructed to instantly become effective when the movement phase is initiated. Of course, it is also conceivable to so construct the damping mechanism to become effective in the end stage of the movement phase.

According to another feature of the present invention, the carrier frame may include at least one slanted leg to interconnect the vertical support portion and the standing area. In this way, the occupant assumes an ergonomically correct posture in upright position, and the standing area can be positioned substantially axially below the roof hatch.

According to another feature of the present invention, the standing area may be constructed for displacement in horizontal direction. In this way, the occupant is not exposed to additional undesired loads when assuming the upright or seated position. The standing area may hereby be constructed for displacement relative to the slanted leg as well as brace. Of course, a length shift of the standing area, e.g. a plate, may be conceivable as well.

In order to improve the balance of the occupant, in particular in upright position, the standing area may have a restraining member for securing footwear of the occupants in place. An example of a restraining member includes a strap which secures the footwear against sliding off from the standing area.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic vertical section of a positioning apparatus according to the present invention for use by an occupant in an exemplary armored vehicle, showing the occupant in upright position;

FIG. 3 is a side view of a carrier frame of the positioning apparatus in combination with a seat assembly for the occupant;

FIG. 4 is a plan view of the carrier frame of FIG. 3, showing a guidance for guiding the carrier frame in horizontal and curved manner; and FIG. 5 is a frontal view of another embodiment of a carrier frame with seat assembly for a positioning apparatus according to the present invention.

DETAILED DESCRIPTION OF PREFERRED EMBODIMENTS

Figure 2:
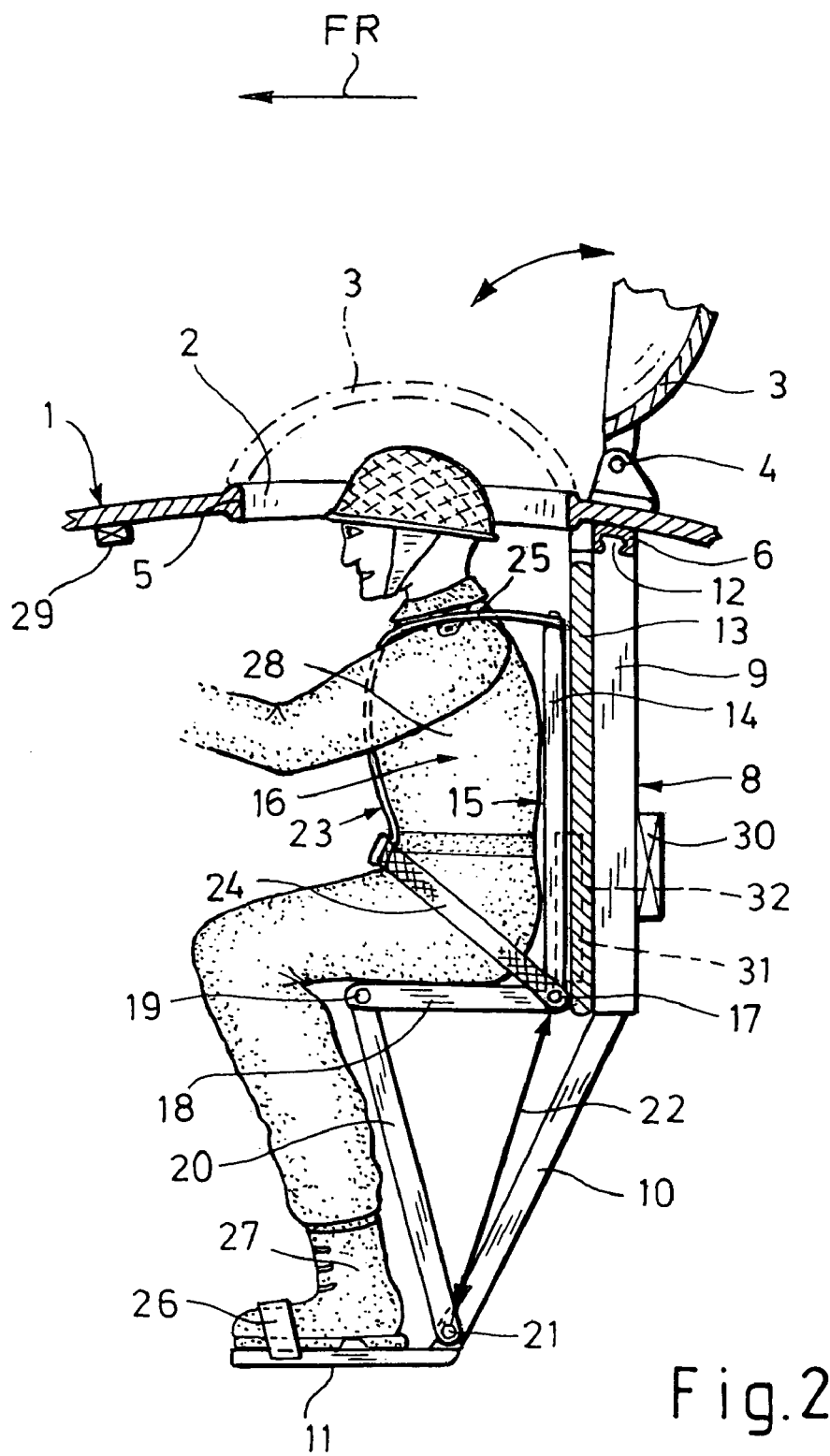
FIG. 2 is a schematic vertical section of the positioning apparatus, showing the occupant in seated position.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic vertical section of a positioning apparatus according to the present invention for use by an occupant in an exemplary armored vehicle, generally indicated by reference numeral 1 and shown here only by those parts that are necessary for the understanding of the invention. The armored vehicle 1 is formed with a roof hatch 2 which can be closed by a hatch cover 3 swingable about a pivot axis 4. Although not shown in the drawing, the hatch cover 3 includes a locking mechanism for securement to the body of the vehicle 1.

Extending inside the vehicle 1 about the perimeter 5 of the hatch 2 is a rail 6 of generally U-shaped cross section. As shown in particular in FIG. 4, the rail 6 extends by about 180° and has ends 7 which are oriented in a plane QE transverse to a longitudinal direction LR of the vehicle 1 and are directed in travel direction FR. The rail 6 is engaged by a sliding block 12 on one end of a carrier frame 8 so that the carrier frame 8 is moveable along the rail 6 to the right or left by about 90°. The carrier frame 8 is comprised of a vertical support portion 9 having one end formed with the sliding block 12 and another end connected to one end of an angled or slanted leg 10 whose other end is connected to a standing area 11 in the form of a plate. The standing area 11 can be made shiftable in a suitable manner in relation to the slanted leg 10 in a direction of double arrow DPF.

As shown in particular in FIG. 3, the vertical support portion 9 of the carrier frame 8 is provided with a rail system 13 for vertical guidance of a backrest 14 of a seat assembly, generally designated by reference numeral 15, for use by an occupant 16 of the vehicle 1, in particular a commander of the vehicle 1. In addition to the backrest 14, the seat assembly 15 has a seating area 18, which is pivotally connected to the backrest 14 about a horizontal pivot axis 17, and a coupling brace 20, which is pivotally connected to the seating area 18 about a horizontal pivot axis 19. The brace 20 may have a plate-shaped configuration and is linked via a horizontal pivot axis 21 in the attachment area of the standing area 11 with the slanted leg 10 of the carrier frame 8.

Integrated in the seat assembly 15 is a gas pressure spring 22, indicated in FIGS. 1 and 2 only by way of a double arrow, for loading the backrest 14 of the seat assembly 15 to seek an uppermost position of the backrest 14, as shown in FIG. 1. In other words, the backrest 14, seating area 18 and brace 20 of the seat assembly 15 assume a substantially stretched configuration, as shown in FIG. 1. The gas pressure spring 22 is linked to the pivot axis 21 of the brace 20 with the standing area 11, on the one hand, and to the pivot axis 17 between the backrest 14 and the seating area 18, on the other hand.

The occupant 16 is fastened by a seat belt 23, e.g. a safety harness, to the backrest 14. The seat belt 23 includes lap belts 24 and shoulder belts 25.

When the hatch cover 3 is swung open, the occupant 16 assumes a substantially upright or standing disposition, as shown in FIG. 1, for surveying the surroundings of the vehicle 1. In this position, the occupant 16 is able to move with the carrier frame 8 along the rail 6 to the left or right by about 90° about a vertical axis. Straps 26 are provided on the standing area 11 to secure the footwear 27 of the occupant 16 in place so as to improve the balance of the occupant 16.

In order to shift from the upright position of FIG. 1 into a seated position, shown in FIG. 2, the occupant 16 needs only to use the weight of the upper body 28 in order to overcome the applied spring force of the gas pressure spring 22 so that the backrest 14 slides downwards along the rail system 13 until the seating area 18 assumes a horizontal position. At the same time, the hatch cover 2 may be swung back to close the hatch 2 and secured to the vehicle 1.

A sensor 29 is further attached to the interior of the vehicle body to respond to accelerations of the vehicle 1 during a rollover or mine explosion. The sensor 29 is operatively connected to an adjustment unit 30, e.g. a gas generator, which is operatively connected to the vertical support portion 9 of the carrier frame 8 and linked to the gas pressure spring 22. In the event, the vehicle 1 and thus the occupant 16 are subjected to a vertical acceleration as a result of a mine explosion, the sensor 29 reacts and activates the adjustment unit 30 to compress the gas pressure spring 22 from the position of FIG. 1 into the position of FIG. 2. Thus, the occupant 16, fastened by the seat belt 23 to the backrest 14, is moved from the dangerous upright position into the safe seated position inside the vehicle 1, as shown in FIG. 2. In order to slow down this movement at least at the end of the entire movement path, damping elements 31, 32 are provided between the backrest 14 and the rail system 13 of the carrier frame 8 for substantially preventing vertical loads upon the thighs 33 and lower legs 34 as well as spine of the occupant 16.

When the occupant 16 desires to stand up again in order to assume the upright position, shown in FIG. 1, it is only necessary to use the own muscle power. The gas pressure spring 22 hereby moves the seat assembly 15 automatically from the angled configuration in FIG. 2 to the substantially stretched configuration of FIG. 1.

Referring now to FIG. 5, there is shown another embodiment of a positioning apparatus according to the present invention. Parts corresponding with those in FIG. 1 are denoted by identical reference numerals and not explained again. The description below will center on the differences between the embodiments. In this embodiment, provision is made for a connection of the gas pressure spring 22 between the vertical support portion 9 of the carrier frame 8 and the backrest 14 of the seat assembly 15 for continuously loading the backrest 14 to seek the upper position, i.e. for the seat assembly 15 to seek the stretched position.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. Apparatus for positioning an occupant of a vehicle in an area of a closeable roof hatch, comprising:
    a carrier frame constructed for suspended securement in a vehicle below a roof hatch and including a vertical support portion and a horizontal standing area connected to the vertical support portion;
    a seat assembly for the occupant, said seat assembly having a backrest guided by the vertical support portion for movement in a vertical direction between upper and lower end positions and spring-biased to seek the upper end position, a seating area swingably mounted to a lower end of the backrest allowing pivotal movement from a horizontal disposition to a substantially vertical position in a direction of the carrier frame out of a movement path of the occupant, when the occupant moves to an upright position, and a coupling brace having one end swingably mounted to the seating area and another end swingably mounted to the standing area; and
  a seat belt connected to the seat assembly.

2. The apparatus of claim 1, wherein the carrier frame is constructed for rotation about a vertical axis.

3. The apparatus of claim 2, wherein the restraining means is a strap.

4. The apparatus of claim 1, wherein the seat assembly includes a spring member for loading the seat assembly to seek a stretched configuration.

5. The apparatus of claim 4, and further comprising an operating mechanism for securement of the seat assembly in the stretched configuration and spontaneously releasing the securement in the event of danger, said operating mechanism including a sensor responsive to a preset acceleration of the vehicle, and an adjustment unit rendered operative by the sensor for moving the seat assembly from the stretched configuration into a collapsed configuration.

6. The apparatus of claim 5, wherein the spring member is a gas pressure spring, said adjustment unit being a gas generator in communication with the gas pressure spring.

7. The apparatus of claim 5, wherein the adjustment unit is an electric motor selected from the group consisting of linear motor and rotary servo motor.

8. The apparatus of claim 4, wherein the spring member is a gas pressure spring.

9. The apparatus of claim 4, wherein the spring member is a torsion spring.

10. The apparatus of claim 4, and further comprising a locking mechanism for securing the seat assembly in the stretched configuration.

11. The apparatus of claim 1, wherein the seat assembly includes at least one sensor and an adjustment unit rendered operative by the sensor for moving the seating area into the horizontal disposition.

12. The apparatus of claim 11, wherein the adjustment unit is formed by a gas generator.

13. The apparatus of claim 1, and further comprising damping means, associated to the carrier frame and the seat assembly, for slowing down a movement of the seat assembly in downwards direction.

14. The apparatus of claim 1, wherein the carrier frame includes a slanted leg interconnecting the vertical support portion and the standing area.

15. The apparatus of claim 1, wherein the standing area is displaceable in a horizontal direction.

16. The apparatus of claim 1, wherein the standing area has restraining means for securing footwear of the occupants in place.

17. The apparatus of claim 1, wherein the seat assembly is so constructed as to move the occupant by about 400 mm from a seated position to an upright position.

18. The apparatus of claim 1, and further comprising a rail constructed for attachment to a body of the vehicle and for engagement of the carrier frame, said rail extending about an angle of approximately 180° allowing movement of the carrier frame to the left by 90° and to the right by 90°.

19. The apparatus of claim 1, wherein the vertical support portion of the carrier frame is of a material to allow limited extension or compression.

20. The apparatus of claim 1, wherein the standing area is configured in the form of a plate.

21. Apparatus for moving an occupant of a vehicle between a seated position and an upright position, comprising:
    a carrier frame constructed for suspended securement to a roof of a vehicle;
    a seat assembly mounted to the carrier frame for movement between a collapsed configuration in which an occupant is seated on a seating area, and a stretched configuration in which the occupant assumes an upright disposition at a distance to a vehicle's bottom, with the seating area pivotally swinging in a direction of the carrier frame, to a substantially vertical position out of a movement path of the occupant when the occupant moves to the upright disposition, said seat assembly being spring-biased to seek the stretched configuration; and a seat belt for fastening the occupant to the seat assembly.

22. The apparatus of claim 21, and further comprising an operating mechanism for securement of the seat assembly in the stretched configuration and spontaneously releasing the securement in the event of danger, said operating mechanism including a sensor responsive to a preset acceleration of the vehicle, and an adjustment unit rendered operative by the sensor for moving the seat assembly from the stretched configuration into the collapsed configuration.

23. The apparatus of claim 21, and further comprising a rail constructed for attachment to the vehicle's roof for engagement of the carrier frame, said rail extending about an angle of approximately 180° allowing movement of the carrier frame to the left by 90° and to the right by 90°.

* * * * *